US012640638B2

(12) United States Patent　　　　(10) Patent No.:　US 12,640,638 B2

Houston et al.　　　　　　　　　　　(45) Date of Patent:　　May 26, 2026

(54) VOLTAGE REGULATOR WITH LATCHED CYCLE-BY-CYCLE CURRENT LIMIT INDICATOR

(71) Applicant: Renesas Electronics America Inc., Milpitas, CA (US)

(72) Inventors: Michael Jason Houston, Cary, NC (US); Brian Lee Allen, Holly Springs, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 283 days.

(21) Appl. No.: 18/592,072

(22) Filed: Feb. 29, 2024

(65) Prior Publication Data

US 2024/0297565 A1　Sep. 5, 2024

Related U.S. Application Data

(60) Provisional application No. 63/488,457, filed on Mar. 3, 2023.

(51) Int. Cl.
| | |
|---|---|
| *H02M 3/158* | (2006.01) |
| *G06F 1/04* | (2006.01) |
| *H02M 1/00* | (2006.01) |
| *H02M 1/32* | (2007.01) |
| *H02M 3/156* | (2006.01) |

(52) U.S. Cl.
CPC ............ *H02M 1/0009* (2021.05); *G06F 1/04* (2013.01); *H02M 1/32* (2013.01); *H02M 3/156* (2013.01); *H02M 3/158* (2013.01)

(58) Field of Classification Search
CPC .............................. H02M 3/156; H02M 3/158
See application file for complete search history.

(56) References Cited

U.S. PATENT DOCUMENTS

| | | | | |
|---|---|---|---|---|
| 10,312,811 | B2 * | 6/2019 | Villot | H02M 3/1588 |
| 10,535,992 | B2 * | 1/2020 | Furuya | H02H 3/087 |
| 10,554,124 | B1 * | 2/2020 | Mangudi | H02M 1/08 |
| 10,862,388 | B1 * | 12/2020 | Gozzini | H02M 3/158 |
| 2006/0221528 | A1 * | 10/2006 | Li | H02M 1/32 |
| | | | | 361/100 |
| 2007/0057654 | A1 * | 3/2007 | Lee | H02M 1/32 |
| | | | | 323/271 |
| 2009/0146629 | A1 * | 6/2009 | Kim | H02M 3/156 |
| | | | | 323/282 |
| 2010/0117686 | A1 * | 5/2010 | Sheahan | H02M 3/156 |
| | | | | 327/93 |
| 2010/0315054 | A1 * | 12/2010 | Gan | H02M 3/156 |
| | | | | 323/283 |

* cited by examiner

*Primary Examiner* — Gary A Nash

(74) *Attorney, Agent, or Firm* — SCULLY, SCOTT, MURPHY & PRESSER, P.C.

(57) ABSTRACT

Systems and methods for a cycle-by-cycle current limit event indicator is described. A circuit can include receiving a plurality of signals indicating occurrences of a plurality of overcurrent events over a plurality of clock cycles in a voltage regulator. The circuit can further include generating a latch signal to indicate the occurrences of the plurality of overcurrent events over the plurality of clock cycles. The latch signal can remain latched at high voltage for a number of clock cycles.

20 Claims, 7 Drawing Sheets

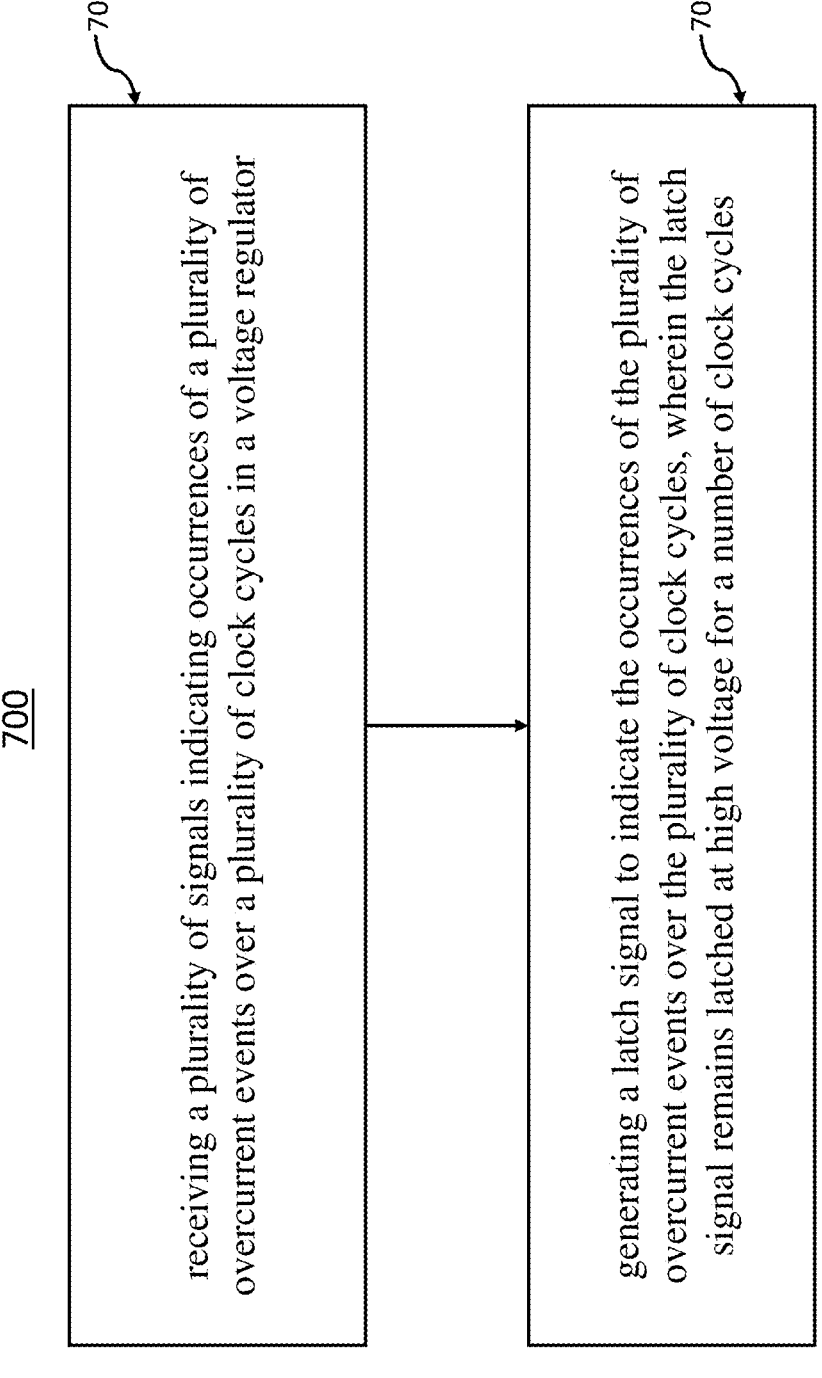

700

701 receiving a plurality of signals indicating occurrences of a plurality of overcurrent events over a plurality of clock cycles in a voltage regulator 703 generating a latch signal to indicate the occurrences of the plurality of overcurrent events over the plurality of clock cycles, wherein the latch signal remains latched at high voltage for a number of clock cycles

Fig. 7

VOLTAGE REGULATOR WITH LATCHED CYCLE-BY-CYCLE CURRENT LIMIT INDICATOR

CROSS-REFERENCE TO RELATED APPLICATION

This application is based upon and claims the benefit of priority under 35 U.S.C. 119 (e) to U.S. Patent Application No. 63/488,457 filed on Mar. 3, 2023, and titled Voltage Regulator with Latched Cycle-by-Cycle Indicator, the entire disclosure of which is incorporated herein by reference in its entirety.

BACKGROUND

The present disclosure relates in general to methods and systems for voltage regulators. Particularly, the voltage regulator includes a latched cycle-by-cycle current limit indicator.

Voltage regulators or voltage converters, such as buck converters and boost converters, can be used for converting an input voltage to an output voltage having a different voltage level. A buck converter, or step-down converter, can convert the input voltage into a lower voltage. A boost converter, or step-up converter, can convert the input voltage into a higher voltage. A buck-boost converter can step up or step down the input voltage. A voltage converter can include multiple switches that can be turned on and off by a pulse width modulated (PWM) control signal. A duty cycle of the PWM control signal can determine an output voltage of the voltage converter.

SUMMARY

In one embodiment, a method that can implement a cycle-by-cycle current limit event indicator is generally described. The method can include receiving a plurality of signals indicating occurrences of a plurality of overcurrent events over a plurality of clock cycles in a voltage regulator. The method can further include generating a latch signal to indicate the occurrences of the plurality of overcurrent events over the plurality of clock cycles. The latch signal can remain latched at high voltage for a number of clock cycles.

In one embodiment, a semiconductor device that can implement a cycle-by-cycle current limit event indicator is generally described. The semiconductor device can include at least one flip-flop. The semiconductor device can further include a latch circuit configured to receive a plurality of signals indicating occurrences of a plurality of overcurrent events over a plurality of clock cycles in a voltage regulator. The latch circuit can be further configured to generate a latch signal to indicate the occurrences of the plurality of overcurrent events over the plurality of clock cycles. The latch signal can remain latched at high voltage for a number of clock cycles, and the number of clock cycles is based on a number of flip-flops among the at least one flip-flop.

In one embodiment, a system that can implement a cycle-by-cycle current limit event indicator is generally described. The system can include a controller configured to detect occurrences of overcurrent events in a voltage regulator. The system can further include a circuit configured to receive a plurality of signals from the controller indicating occurrences of a plurality of overcurrent events over a plurality of clock cycles in the voltage regulator. The circuit can further be configured to generate a latch signal to indicate the occurrences of the plurality of overcurrent events over the plurality of clock cycles. The latch signal can remain latched at high voltage for a number of clock cycles.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 7 is a flow diagram illustrating a process that can implement voltage regulation with current sensing for cycle-by-cycle current limit in one embodiment.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
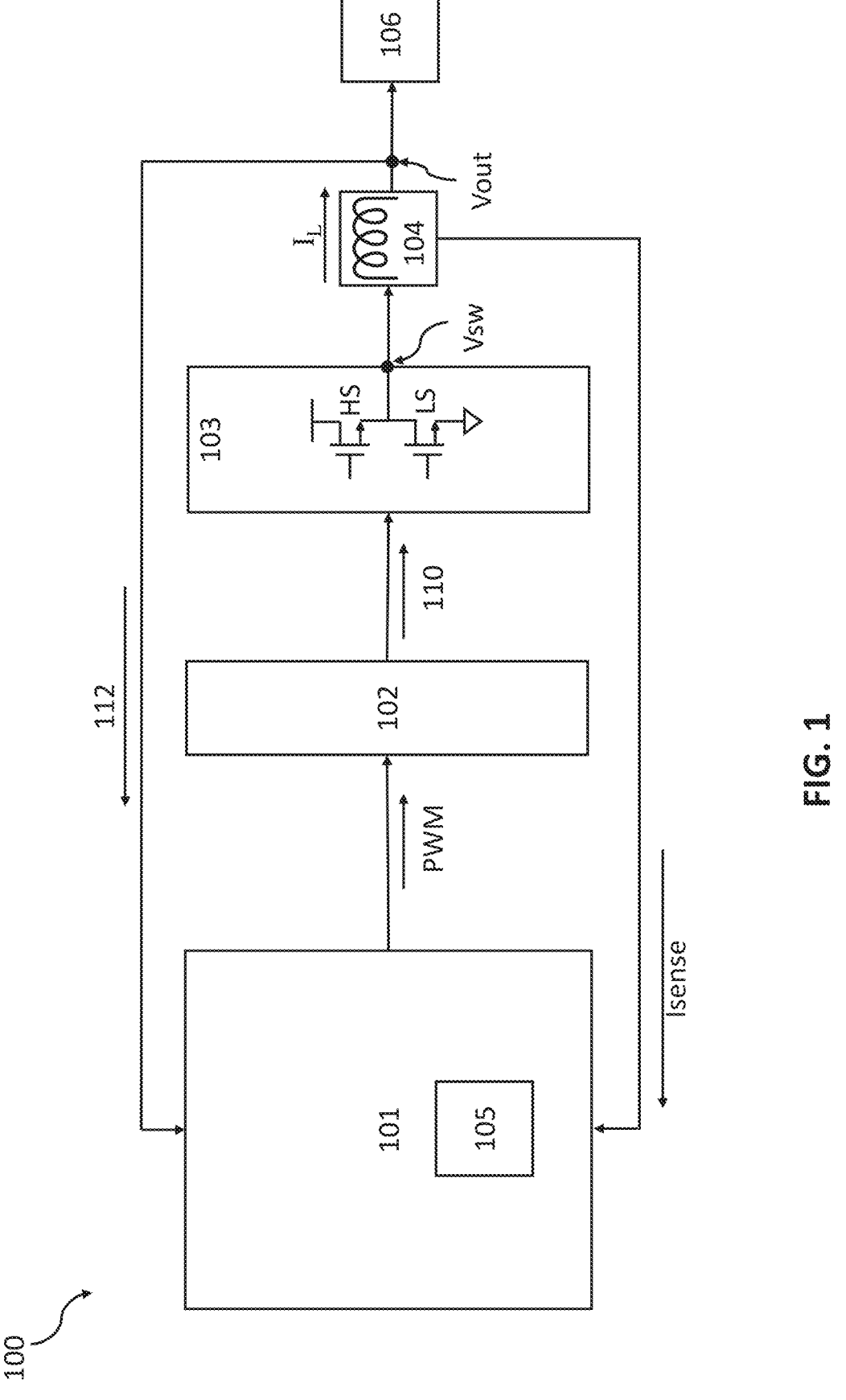
FIG. 1 is a diagram showing an example system that can implement voltage regulation with current sensing for cycle-by-cycle current limit in one embodiment.

FIG. 1 is a diagram showing a system that can implement a latched cycle-by-cycle current limit event indicator in one embodiment. A system 100 shown in FIG. 1 can be implemented by a voltage regulation system or voltage converter. In the embodiment shown in FIG. 1, system 100 can be implemented by a single phase voltage regulator. System 100 can include a controller 101, driver integrated circuit (IC) 102, power stage 103, inductor 104, and load 106.

Controller 101 can include, for example, a processor, microcontroller, central processing unit (CPU), field-programmable gate array (FPGA) or any other circuitry that is configured to control and operate power stage 103. While described as a CPU in illustrative embodiments, controller 101 is not limited to a CPU in these embodiments and may comprise any other circuitry that is configured to control and operate driver IC 102. Controller 101 can be configured to generate control signals, such as pulse width modulation (PWM) or pulse frequency modulation (PFM) signals for controlling a driver IC 102 to selectively turn switches HS and LS in power stage 103 on and off. To be described in more detail below, controller 101 can include a circuit 105 configured to output a signal indicating a cycle by cycle (CBC) current events, where CBC current events can be overcurrent events that occur across more than one consecutive PWM or clock cycles.

Driver IC 102 can be configured to receive PWM signals from controller 101. Driver IC 102 can generate drive signals 110 using the received PWM signals. Driver IC 102 can drive the switches in power stage 103 via drive signals 110. Drive signals 110 can be a voltage signal having a gate voltage that can turn on or off the high-side (HS) and low-side (LS) switches of power stage 103. In one embodiment, HS and LS switches can be field-effect transistors (FETs) such as metal oxide semiconductor field effect transistors (MOSFETs). In other embodiments, HS and LS switches can be diodes or insulated-gate bipolar transistors (IGBTs). Driver IC 102 can include a driver configured to drive HS switch and another driver configured to drive LS switch in power stage 103. Driver IC 102 can be configured to provide the gate voltages or drive signals 110 to drive HS and LS switches. HS switch can be configured to be switched on while LS switch is switched off, and vice versa. When HS switch is switched on and LS switch is switched off, a voltage at a switch node Vsw between HS switch and LS switch can be pulled up to Vin such that the voltage at the switch node Vsw is equivalent to Vin. When HS is switched off and LS is switched on, the voltage at the switch node can be pulled down to ground, hence Vsw is equivalent to zero.

Power stage 103 can be configured to receive drive signals 110 from driver IC 102. The HS and LS switches can be switched on and off to generate output voltage Vout. Output voltage Vout can be outputted to, for example, a load 106 through an inductor 104. Vout can be fed back to controller 101 as a feedback signal 112 to provide controller 101 with feedback information. The current across the inductor 104 can be inductor current $I_L$. $I_L$ can be a sensed current Isense that can be fed back to controller 101.

In voltage regulation systems, overcurrent events can occur. Overcurrent events can be an event where inductor current $I_L$ exceeds a predefined current limit $I_{Limit}$. Controller 101 can perform peak current limiting to implement a current loop that can regulate inductor current $I_L$ at the current limit $I_{Limit}$ when inductor current $I_L$ begins to exceed $I_{Limit}$. In an aspect, the current demand by load 106 can vary depending on the operations being performed by load 106. By way of example, if load 106 is a microprocessor of a computing device, then the microprocessor can draw more current when the computing device is running a video game and the microprocessor can draw less current when the computing device is running a web word processing application. The changes in load current can change inductor current $I_L$ and may cause inductor current $I_L$ to exceed current limit $I_{Limit}$. Due to the switching of power stage 103, the inductor current $I_L$ may fluctuate above and below the current limit for a time period in which load 106 is drawing current that causes inductor current $I_L$ to exceed $I_{Limit}$. Each time the inductor current $I_L$ crosses above the current limit, controller 101 may count one overcurrent event. If load 106 is drawing current that causes inductor current $I_L$ to exceed the current limit $I_{Limit}$ for N times within a time period, then controller 101 will count N times within the time period as well. To be described in more detail below, circuit 105 in controller 101 can output a signal indicating one or more overcurrent events without a need for controller 101 to count the overcurrent events multiple times. Using circuit 105 to output a single signal to indicate multiple overcurrent events can reduce power consumption and processing time for controller 101 to perform the multiple counts.

Figure 2:
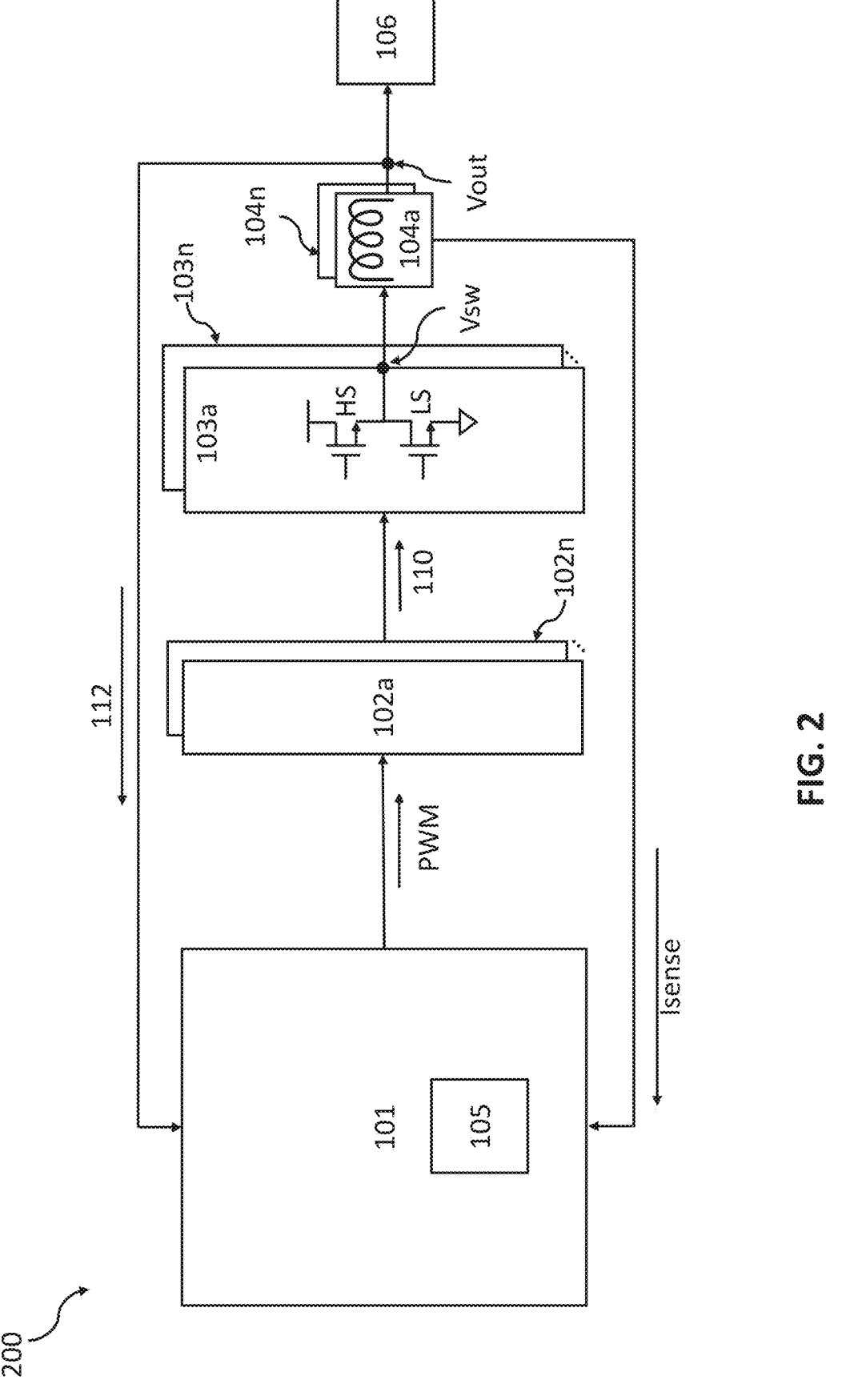
FIG. 2 is a diagram showing an example multiphase voltage regulator system that can implement a cycle-by-cycle current limit event indicator in another embodiment.

FIG. 2 is a diagram showing a system that can implement a latched cycle by cycle current limit event indicator in another embodiment. Description of FIG. 2 can reference components that are shown in FIG. 1. A system 200 shown in FIG. 2 can be implemented by a voltage regulation system or voltage converter. In the embodiment shown in FIG. 2, system 200 can be implemented by a multi-phase voltage regulator. System 200 can include controller 101, a plurality of driver integrated circuits (ICs) 102a-102n (hereinafter "102"), a plurality of power stages 103a-103n (hereinafter "103"), a plurality of inductors 104a-104n (hereinafter "104"), and load 106. Circuit 105 in controller 101 can be further configured to output a signal indicating CBC current events that occur in at least one of the plurality of power stages 103. By way of example, if overcurrent events are not occurring in power stage 103a but is occurring in power stage 103b, then circuit 105 can output the signal to indicate that CBC current events are occurring in at least one of the plurality of power stages 103. By using circuit 105 to output a single signal to indicate multiple overcurrent events, controller 101 may not need to count individual overcurrent events for each power stage, thus reducing power consumption and processing time.

Figure 3:
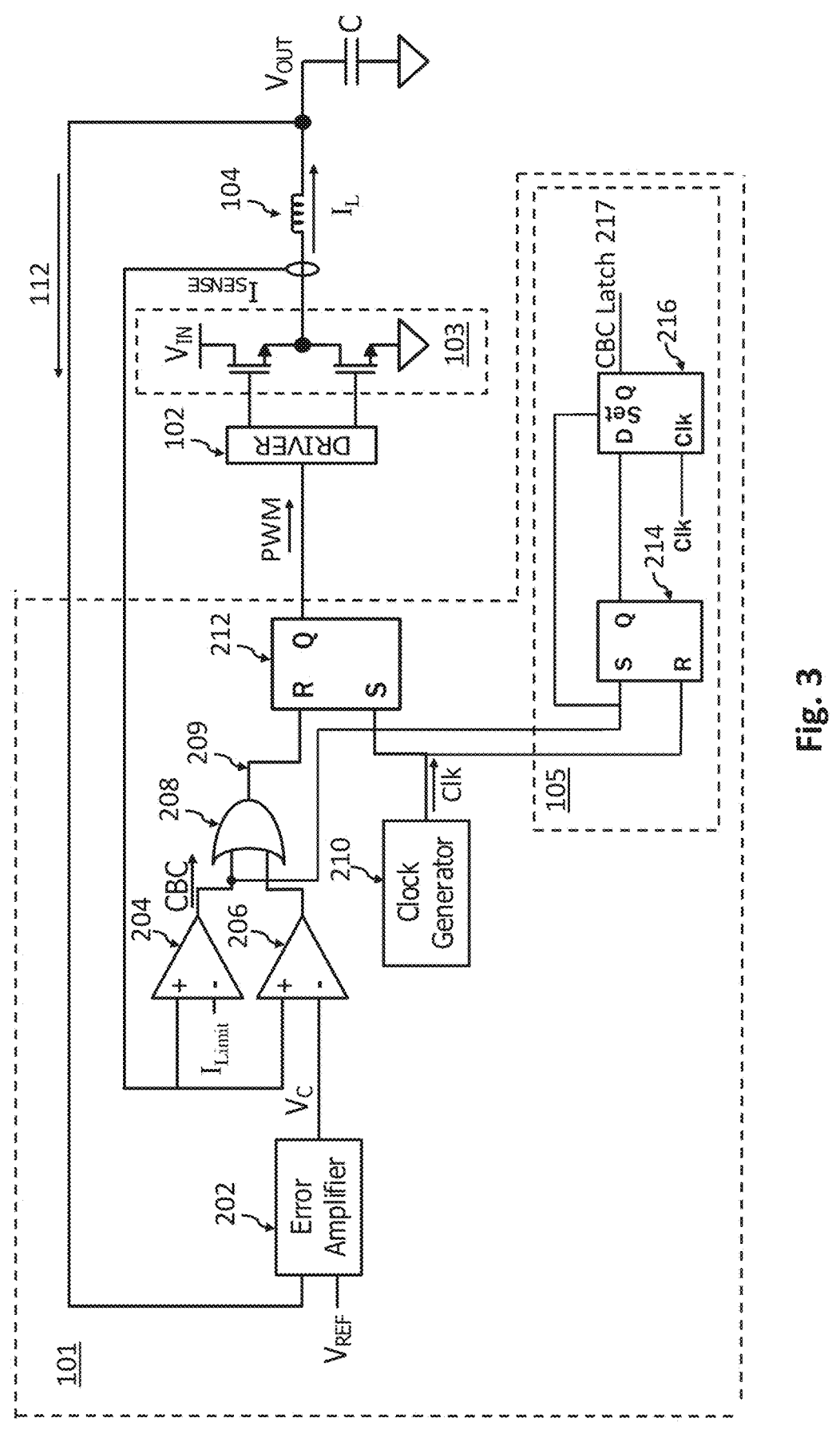
FIG. 3 is a diagram showing additional details of the example system of FIG. 1 in one embodiment.

FIG. 3 is a diagram showing additional details of the system of FIG. 1 in one embodiment. Description of FIG. 3 can reference components that are shown in FIG. 1 to FIG. 2. In the embodiment shown in FIG. 3, controller 101 can include an error amplifier 202, comparators 204 and 206, OR gate 208, clock generator 210, S-R latch 212, and circuit 105. Error amplifier circuit 202 can be configured to receive output voltage Vout as feedback signal 112. Error amplifier 202 can also receive a predefined reference voltage Vref. Error amplifier 202 can compare Vout indicated by the feedback signal 112 with Vref to generate an error difference and can generate a control voltage Vc based on the error difference. Comparator 204 can receive a sensed current $I_{sense}$ sensing the inductor current $I_L$ as the non-inverting (+) input and a current signal $I_{Limit}$ as the inverting (−) input. Comparator 204 can be configured to generate a CBC signal. Comparator 206 can be configured to receive Vc from the error amplifier 202 as the inverting (−) input and the sensed current Isense as the non-inverting input. OR gate 208 can receive the outputs of comparators 204 and 206. The OR gate 208 can generate a signal 209 based on the outputs of comparators 204 and 206 for S-R latch 212.

S-R latch 212 can receive the output of OR gate 208, such as the signal 209, at the reset pin R. S-R latch 212 can also receive a clock signal Clk generated by clock generator 210 at the set pin S. The S-R latch 212 can be configured to generate the PWM signal based on the input voltages at the set and reset pins of S-R latch 212. The PWM signals can be outputted to driver IC 102 and driver 102 can generate drive signals 110 to drive the power stage 103. For example, a voltage input at the reset pin R can reset the PWM signal to make it low and a voltage input at the set pin S can set the PWM signal to make it high. When the S-R latch 212 receives the output CBC signal from the OR gate 208 and the clock signal Clk from clock signal 210, alternatively and continuously cycle-by-cycle, S-R latch 212 can output a high signal and low signal alternatively to generate a PWM signal. Note that the path where feedback signal 112 loops back from Vout to error amplifier 202, then through comparator 206 and OR gate 208 to reach S-R latch 214 is a voltage control loop that can be performed by controller 101 to regulate Vout. Also, the path where inductor current $I_L$ is sensed and provided to comparator 204, then through OR gate 208 to reach S-R latch 214 is a current control loop that can be performed by controller 101 to regulate $I_L$.

Circuit 105 can include an S-R latch 214 and at least one D-type flip flop 216. S-R latch 214 can be configured to receive CBC signal from comparator 204 at the set pin S. S-R latch 214 can be configured to receive the clock signal Clk at the reset pin R. The output of the S-R latch 214 at pin Q can be outputted to the D pin of the D-type flip flop 216. D-type flip flop 216 can be configured to receive the clock signal Clk at the clock input.

In one embodiment, when controller 101 regulates the inductor current $I_L$ at the current limit $I_{limit}$ for multiple consecutive clock cycles or PWM cycles. Output of comparator 204 (e.g., CBC signal) can toggle high and low multiple times as the inductor current $I_L$ is fluctuating above and below the current limit $I_{limit}$ during a duration of the multiple consecutive clock cycles. The value of the CBC signal, such as high or low, can reflect this fluctuation behavior. S-R latch 214 can be configured to output a CBC latch signal 217 high when comparator 204 outputs the CBC signal as a high voltage. The D-type flip-flop 216 can be configured to delay the CBC latch signal 217 from dropping to a low voltage for a number of cycles, thus allowing circuit 105 to detect overcurrent events for more than one clock cycles. In the embodiment shown in FIG. 3, circuit 105 includes one copy of D-type flip-flop 216 such that when the CBC signal from comparator 204 is high for an i-th clock cycle and low for a next clock cycle (e.g., i+1), the CBC latch signal 217 can remain high for both the i-th clock cycle and the next clock cycle (e.g., i+1). As a result of using one copy of D-type flip-flop to delay the CBC latch signal 217 from dropping to low voltage for one additional clock cycle, when an overcurrent event occurs at clock cycle i+2, comparator 204 can output CBC signal as high and the CBC latch signal 217 can remain high as well. Thus, for clock cycles i to i+2, comparator 204 can output a sequence of high-low-high and CBC latch signal 217 remains high for clock cycles i to i+2, thus CBC latch signal 217 can indicate CBC events that include two overcurrent events across three clock cycles. If overcurrent event does not occur at clock cycle i+2, comparator 204 can output CBC signal as low and the CBC latch signal 217 can drop to low as well, indicating a termination of CBC events after two clock cycles. The number of D-type flip-flops 216 in circuit 105 can be arbitrary (See FIG. 4). As a result of outputting the CBC latch signal 217 and using D-type flip-flop 216 to delay the falling edge of CBC latch signal 217, a single indicator can be outputted even though the output of comparator 204 toggles between high and low multiple times, which allows for a more efficient system when compared to conventional systems that may output a CBC indicator for every toggle. With multiphase voltage regulators, indicating every CBC toggle becomes even more complicated, thus using a single signal to indicate the start and end of CBC current events for more than one phases can be relatively more efficient and simplifies reporting of the overload information.

Figure 4:
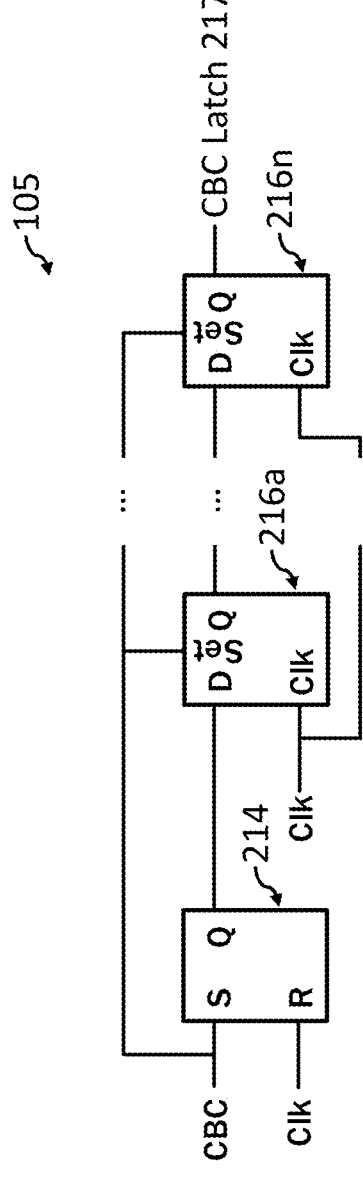
FIG. 4 is a diagram showing additional details of an example circuit shown in FIG. 3 in one embodiment.

FIG. 4 is a diagram showing additional details of an example circuit shown in FIG. 3 in one embodiment. In the embodiment shown in FIG. 4, circuit 105 can include more than one D-type flipflops 216a to 216n (hereinafter "216"). The number of D-type flip-flops 216 can determine a number of clock cycles to hold the CBC latch signal 217 at high voltage. For every D-type flip flop 216 added, the circuit 105 needs to check if CBC signal ends for an extra cycle. For example, if circuit 105 comprises of 3 D-type flip flops 216a, 216b, and 216c, then circuit 105 can output the CBC latch signal 217 at high voltage for at least three clock cycles. By way of example, when the CBC signal from comparator 204 is high for an i-th clock cycle and low for the next three clock cycle (e.g., i+1, i+2, i+3), the CBC latch signal 217 can remain high from clock cycle i to i+3. If As a result of using one copy of D-type flip-flop to delay the CBC latch signal 217 from dropping to low voltage for one additional clock cycle, when an overcurrent event occurs at clock cycle i+4, comparator 204 can output CBC signal as high and the CBC latch signal 217 can remain high as well. Thus, for clock cycles i to i+4, comparator 204 can output a sequence of high-low-low-low-high and CBC latch signal 217 remains high for clock cycles i to i+4, thus CBC latch signal 217 can indicate CBC events that include two overcurrent events across five clock cycles. If overcurrent event does not occur at clock cycle i+4, comparator 204 can output CBC signal as low and the CBC latch signal 217 can drop to low as well, indicating a termination of CBC events after four clock cycles. If circuit 105 includes K D-type flip-flops, then the CBC latch signal 217 can remain high for at least K clock cycles.

Figure 5:
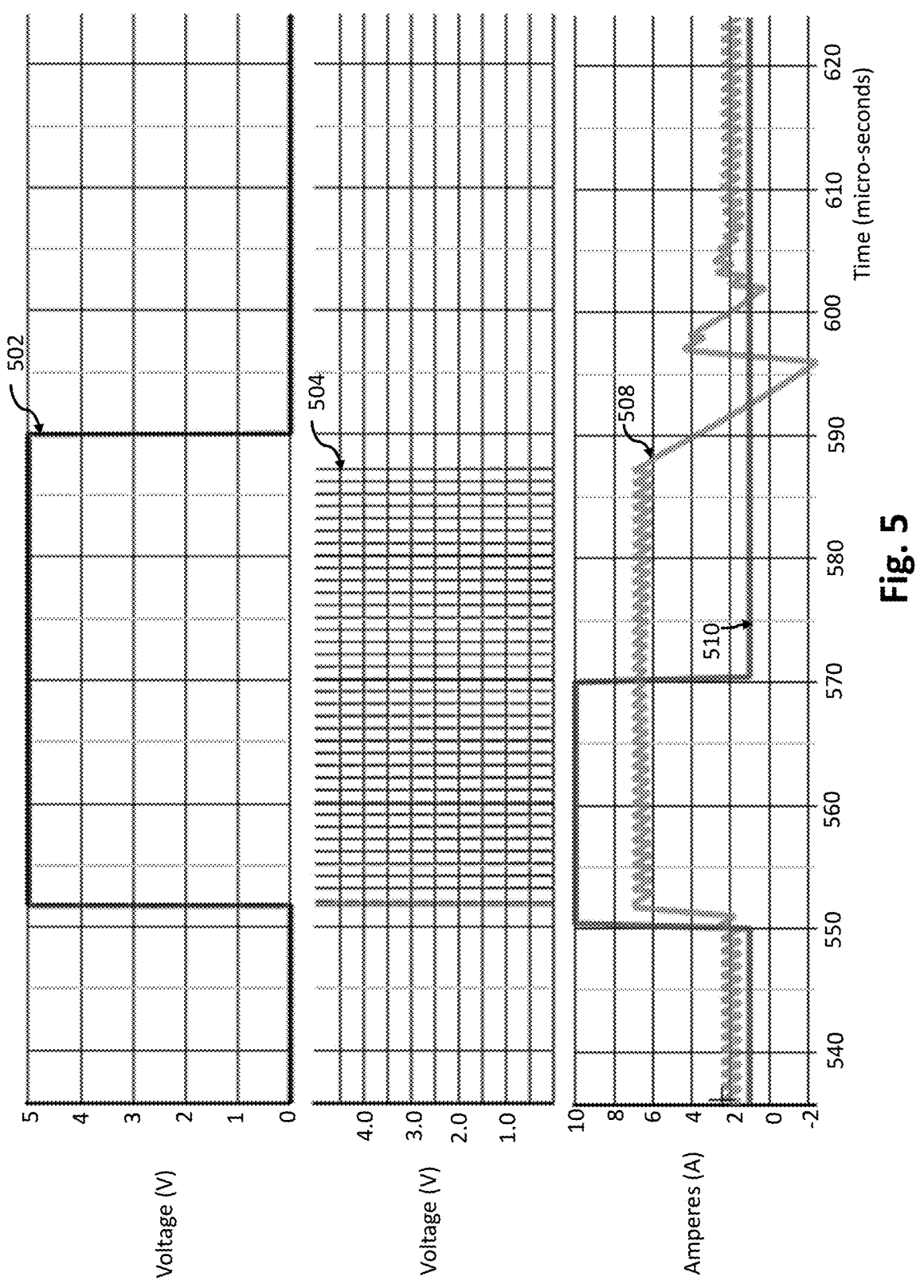
FIG. 5 is a diagram illustrating a set of signal waveforms resulting from an implementation of a cycle-by-cycle current limit event indicator in another embodiment.

FIG. 5 is a diagram illustrating a set of signal waveforms resulting from an implementation of a cycle-by-cycle current limit event indicator in another embodiment. Descriptions of FIG. 5 may reference components shown in FIGS. 1-4. In an example embodiment, a signal waveform 502 illustrates the CBC latch signal 217 indicating a single CBC current event. A signal waveform 504 illustrates the CBC signal generated by comparator 204. A signal waveform 510 illustrates the load current being drawn by load 106 and a signal waveform 508 illustrates the inductor current $I_L$. At approximately 550 microseconds, load 106 demands a higher current causing controller 101 to inductor current $I_L$ to increase. The increased inductor current $I_L$ can supply the increased demand by load 106, thus increasing inductor current (e.g., signal waveform 508) as well. In response to the load current increasing, the inductor current can be limited to a current limit, such as about 7 amperes, between 550 and 590 microseconds (e.g., starting from 550 microseconds until load current decreases). The current limit spikes as illustrated by signal waveform 504 between 550 and 590 microseconds correspond to the CBC signal from comparator 204 toggling on and off. Signal waveform 504, e.g., CBC signal, is generated by comparator 204 toggling on and off as the inductor current $I_L$ is being limited by current limit $I_{Limit}$. The CBC latch signal 217 illustrated by signal waveform 502 indicates a single CBC current event that starts at the time the CBC signal is generated (e.g., first spike of signal waveform 504 at approximately 551 to 552 microseconds) and ends when the CBC signal (e.g., signal waveform 508) stops toggling. When the inductor current waveform 508 stops being limited, toggling of the CBC signal end, and the signal waveform 502 of CBC latch signal 217 can indicate the end of the CBC current events by its falling edge. The CBC current event illustrated by signal waveform 502 has a slight delay between the last high CBC signal (e.g., last spike of signal waveform 504) and the falling edge of the CBC latch signal 217 because of the amount of d-type flip flops 216 included in circuit 105. Additionally added d-type flip-flops could increase the delay of the falling edge of the signal waveform 502 of CBC latch signal 217.

Figure 6:
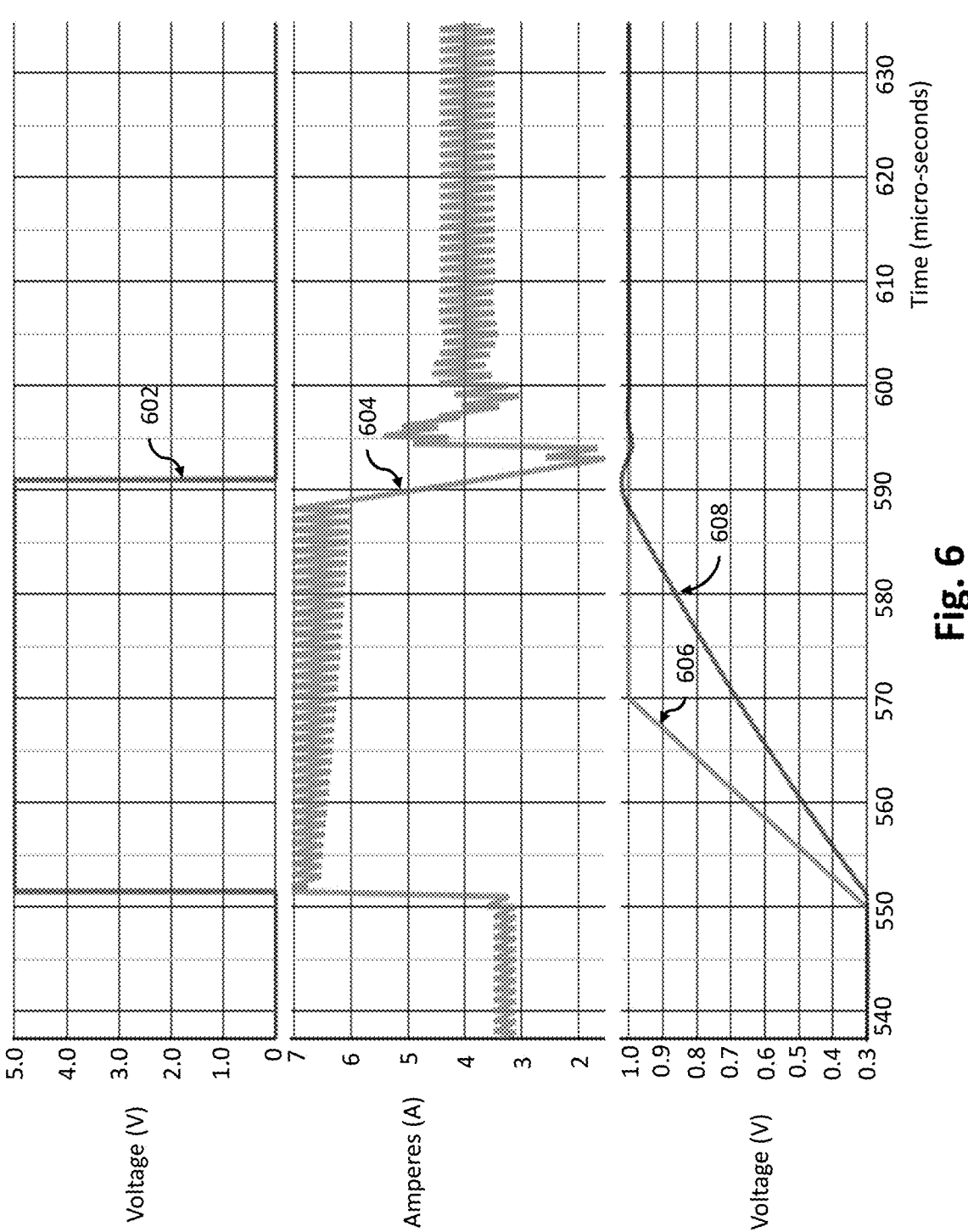
FIG. 6 is a diagram illustrating another set of signal waveforms resulting from an implementation of a cycle-by-cycle current limit event indicator in another embodiment.

FIG. 6 is a diagram illustrating another set of signal waveforms resulting from an implementation of a cycle-by-cycle current limit event indicator in another embodiment. Descriptions of FIG. 6 may reference components shown in FIGS. 1-5. In the embodiment shown in FIG. 6, a signal waveform 602 illustrates the CBC latch signal 217. A signal waveform 604 illustrates the inductor current $I_L$, a signal waveform line 606 illustrates the reference voltage Vref (see FIG. 3), and a signal waveform 608 illustrates the output voltage Vout. As shown in the embodiment of FIG. 6, the CBC latch signal 217 can indicate a time duration in which output voltage Vout reaches a desired regulated voltage (e.g., 1V) after being delayed by overcurrent conditions during dynamic output voltage changes. Load 106 can require higher power which can be depicted by signal waveform 606 stepping up the voltage level from 0.3 V to 1.0 V. To increase the output voltage to reach the 1.0 V level requested by load 106, the inductor current $I_L$ can operate at current limit, such as 7 A depicted by signal waveform 604. When the output voltage Vout reaches the required voltage of 1.0 V, the inductor current $I_L$ can decrease and drops below the current limit. Using the CBC latch signal 217 as illustrated by signal waveform 602, the time it takes for the output voltage Vout to reach the desired voltage level can indicated by a difference between the rising edge and the falling edge of the CBC latch signal 217. Also, the time of the falling edge of the CBC signal 217 can be the time in which the output voltage Vout reaches the desired voltage level.

FIG. 7 is a flow diagram illustrating another process to implement a switching frequency regulator and a minimum on time override function in another embodiment. Descriptions of FIG. 6 may reference components shown in FIGS. 1-6. The process 700 can include one or more operations, actions, or functions as illustrated by one or more of blocks 701 and 703. Although illustrated as discrete blocks, various blocks can be divided into additional blocks, combined into fewer blocks, eliminated, performed in different order, or performed in parallel, depending on the desired implementation.

Process 700 can be implemented by a voltage regulator system. For example, controller 101 of voltage regulator system 100 can perform process 700. Process 700 can begin at block 701. At block 701, a controller can receive a plurality of signals indicating occurrences of a plurality of overcurrent events over a plurality of clock cycles in a voltage regulator. Process 700 can continue from block 701 to block 703. At block 703, the controller can generate a latch signal to indicate the occurrences of the plurality of overcurrent events over the plurality of clock cycles. The latch signal can remain latched at high voltage for a number of clock cycles.

In another embodiment, the number of clock cycles can be based on a programmable delay to delay a falling edge of the latch signal. In another embodiment, the voltage regulator can be a single phase voltage regulator. In another embodiment, the voltage regulator can be a multi-phase voltage regulator.

In another embodiment, the controller can determine, based on the latch signal, a time duration for an output voltage of the voltage regulator to reach a regulated voltage. In another embodiment, the controller can receive, in a first clock cycle among the plurality of clock cycles, a first signal among the plurality of signals, the first signal indicating a presence of an overcurrent event in the voltage regulator. The controller can further, in response to receiving the first signal indicating the presence of the overcurrent event in the first clock cycle, latch the latch signal at high voltage. The controller can further receive, in a second clock cycle among the plurality of clock cycles, a second signal among the plurality of signals, the second signal indicating an absence of a overcurrent event in a voltage regulator. The controller can further, in response to receiving the second signal indicating the absence of the overcurrent event in the second clock cycle, maintain the latch signal at high voltage.

In another embodiment, the controller can receive, in a first clock cycle among the plurality of clock cycles, a first signal among the plurality of signals, the first signal indicating a presence of an overcurrent event in the voltage regulator. The controller can further, in response to receiving the first signal indicating the presence of the overcurrent event in the first clock cycle, latch the latch signal at high voltage. The controller can further receive, in a second clock cycle among the plurality of clock cycles, a second signal among the plurality of signals, the second signal indicating an absence of an overcurrent event in a voltage regulator. The controller can further, in response to receiving the second signal indicating the absence of the overcurrent event in the second clock cycle, maintain the latch signal at high voltage. The controller can further receive, in a third clock cycle among the plurality of clock cycles, a third signal among the plurality of signals, the third signal indicating another presence of an overcurrent event in a voltage regulator. The controller can further, in response to receiving the third signal indicating the presence of the overcurrent event in the third clock cycle, maintain the latch signal at high voltage.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

9

What is claimed is:

1. A method comprising:
   receiving a plurality of signals indicating occurrences of a plurality of overcurrent events over a plurality of clock cycles in a voltage regulator; and
   generating a latch signal to indicate the occurrences of the plurality of overcurrent events over the plurality of clock cycles, wherein the latch signal remains latched at high voltage for a number of clock cycles.

2. The method of claim 1, wherein the number of clock cycles is based on a programmable delay to delay a falling edge of the latch signal.

3. The method of claim 1, wherein the voltage regulator is a single phase voltage regulator.

4. The method of claim 1, wherein the voltage regulator is a multi-phase voltage regulator.

5. The method of claim 1, further comprising determining, based on the latch signal, a time duration for an output voltage of the voltage regulator to reach a regulated voltage.

6. The method of claim 1, further comprising:
   receiving, in a first clock cycle among the plurality of clock cycles, a first signal among the plurality of signals, the first signal indicating a presence of a overcurrent event in the voltage regulator;
   in response to receiving the first signal indicating the presence of the overcurrent event in the first clock cycle, latching the latch signal at high voltage;
   receiving, in a second clock cycle among the plurality of clock cycles, a second signal among the plurality of signals, the second signal indicating an absence of a overcurrent event in a voltage regulator; and
   in response to receiving the second signal indicating the absence of the overcurrent event in the second clock cycle, maintaining the latch signal at high voltage.

7. The method of claim 1, further comprising:
   receiving, in a first clock cycle among the plurality of clock cycles, a first signal among the plurality of signals, the first signal indicating a presence of a overcurrent event in the voltage regulator;
   in response to receiving the first signal indicating the presence of the overcurrent event in the first clock cycle, latching the latch signal at high voltage;
   receiving, in a second clock cycle among the plurality of clock cycles, a second signal among the plurality of signals, the second signal indicating an absence of a overcurrent event in a voltage regulator;
   in response to receiving the second signal indicating the absence of the overcurrent event in the second clock cycle, maintaining the latch signal at high voltage;
   receiving, in a third clock cycle among the plurality of clock cycles, a third signal among the plurality of signals, the third signal indicating another presence of a overcurrent event in a voltage regulator; and
   in response to receiving the third signal indicating the presence of the overcurrent event in the third clock cycle, maintaining the latch signal at high voltage.

8. A semiconductor device comprising:
   at least one flip-flop;
   a latch circuit configured to:
      receive a plurality of signals indicating occurrences of a plurality of overcurrent events over a plurality of clock cycles in a voltage regulator; and
      generate a latch signal to indicate the occurrences of the plurality of overcurrent events over the plurality of clock cycles, wherein the latch signal remains latched at high voltage for a number of clock cycles, and the number of clock cycles is based on a number of flip-flops among the at least one flip-flop.

9. The semiconductor device of claim 8, wherein:
   the at least one flip-flop comprises at least one D-type flip-flop; and
   the latch circuit is a S-R latch.

10. The semiconductor device of claim 8, wherein the voltage regulator is a single phase voltage regulator.

11. The semiconductor device of claim 8, wherein the voltage regulator is a multi-phase voltage regulator.

12. The semiconductor device of claim 8, wherein a time duration for an output voltage of the voltage regulator to reach a regulated voltage is indicated by the latch signal.

13. The semiconductor device of claim 8, wherein the latch circuit is further configured to:
   receive, in a first clock cycle among the plurality of clock cycles, a first signal among the plurality of signals, the first signal indicating a presence of a overcurrent event in the voltage regulator;
   in response to receipt of the first signal indicating the presence of the overcurrent event in the first clock cycle, latch the latch signal at high voltage;
   receive, in a second clock cycle among the plurality of clock cycles, a second signal among the plurality of signals, the second signal indicating an absence of a overcurrent event in a voltage regulator; and
   in response to receipt of the second signal indicating the absence of the overcurrent event in the second clock cycle, maintain the latch signal at high voltage.

14. The semiconductor device of claim 8, wherein the latch circuit is further configured to:
   receive, in a first clock cycle among the plurality of clock cycles, a first signal among the plurality of signals, the first signal indicating a presence of a overcurrent event in the voltage regulator;
   in response to receipt of the first signal indicating the presence of the overcurrent event in the first clock cycle, latch the latch signal at high voltage;
   receive, in a second clock cycle among the plurality of clock cycles, a second signal among the plurality of signals, the second signal indicating an absence of a overcurrent event in a voltage regulator; and
   in response to receipt of the second signal indicating the absence of the overcurrent event in the second clock cycle, maintain the latch signal at high voltage;
   receive, in a third clock cycle among the plurality of clock cycles, a third signal among the plurality of signals, the third signal indicating another presence of a overcurrent event in a voltage regulator; and
   in response to receipt of the third signal indicating the presence of the overcurrent event in the third clock cycle, maintain the latch signal at high voltage.

15. A system comprising:
   a controller configured to detect occurrences of overcurrent events in a voltage regulator;
   a circuit configured to:
      receive a plurality of signals from the controller indicating occurrences of a plurality of overcurrent events over a plurality of clock cycles in the voltage regulator; and
      generate a latch signal to indicate the occurrences of the plurality of overcurrent events over the plurality of clock cycles, wherein the latch signal remains latched at high voltage for a number of clock cycles.

16. The system of claim 15, wherein the number of clock cycles is based on a programmable delay to delay a falling edge of the latch signal.

17. The system of claim 15, wherein the voltage regulator is a single phase voltage regulator.

18. The system of claim 15, wherein the voltage regulator is a multi-phase voltage regulator.

19. The system of claim 15, wherein the circuit is further configured to:

receive, in a first clock cycle among the plurality of clock cycles, a first signal among the plurality of signals, the first signal indicating a presence of a overcurrent event in the voltage regulator;

in response to receipt of the first signal indicating the presence of the overcurrent event in the first clock cycle, latch the latch signal at high voltage;

receive, in a second clock cycle among the plurality of clock cycles, a second signal among the plurality of signals, the second signal indicating an absence of a overcurrent event in a voltage regulator; and in response to receipt of the second signal indicating the absence of the overcurrent event in the second clock cycle, maintain the latch signal at high voltage.

20. The system of claim 15, wherein the circuit is further configured to:

receive, in a first clock cycle among the plurality of clock cycles, a first signal among the plurality of signals, the first signal indicating a presence of a overcurrent event in the voltage regulator;

in response to receipt of the first signal indicating the presence of the overcurrent event in the first clock cycle, latch the latch signal at high voltage;

receive, in a second clock cycle among the plurality of clock cycles, a second signal among the plurality of signals, the second signal indicating an absence of a overcurrent event in a voltage regulator; and in response to receipt of the second signal indicating the absence of the overcurrent event in the second clock cycle, maintain the latch signal at high voltage;

receive, in a third clock cycle among the plurality of clock cycles, a third signal among the plurality of signals, the third signal indicating another presence of a overcurrent event in a voltage regulator; and in response to receipt of the third signal indicating the presence of the overcurrent event in the third clock cycle, maintain the latch signal at high voltage.

* * * * *